(12) United States Patent
Uebayashi et al.

(10) Patent No.: US 6,963,551 B2
(45) Date of Patent: *Nov. 8, 2005

(54) SIGNAL TRANSMISSION METHOD AND BASE STATION IN MOBILE COMMUNICATION

(75) Inventors: Shinji Uebayashi, Kanagawa (JP); Seizo Onoe, Kanagawa (JP); Minami Ishii, Kanagawa (JP); Takehiro Nakamura, Kanagawa (JP)

(73) Assignee: NTT Mobile Communications Network, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 39 days.

(21) Appl. No.: 09/294,630

(22) Filed: Apr. 19, 1999

(65) Prior Publication Data
US 2003/0198205 A1 Oct. 23, 2003

Related U.S. Application Data

(63) Continuation of application No. PCT/JP98/03666, filed on Aug. 19, 1998.

(30) Foreign Application Priority Data
Aug. 19, 1997 (JP) .................................. 1997-222182

(51) Int. Cl.[7] .................................. H04Q 7/28
(52) U.S. Cl. .................. 370/335; 370/341; 370/342; 370/441; 455/509; 455/516
(58) Field of Search .................. 370/252, 328, 370/329, 332, 335, 341, 342, 441, 468, 479, 437, 442, 443, 235; 455/509, 512, 516, 561, 450, 522

(56) References Cited

U.S. PATENT DOCUMENTS

| 5,361,399 A | * | 11/1994 | Linquist et al. ............ 455/56.1 |
| 5,583,851 A | | 12/1996 | Kato et al. |
| 5,586,113 A | | 12/1996 | Adachi et al. |
| 5,594,738 A | | 1/1997 | Crisler et al. |
| 5,734,646 A | * | 3/1998 | I et al. ........................ 370/335 |
| 5,734,648 A | | 3/1998 | Adachi et al. |
| 5,745,480 A | * | 4/1998 | Behtash et al. ............. 370/252 |
| 5,794,129 A | | 8/1998 | Komatsu |
| 5,930,242 A | * | 7/1999 | Mimura ...................... 370/331 |
| 5,946,356 A | * | 8/1999 | Felix et al. ................. 375/295 |
| 5,956,332 A | * | 9/1999 | Rasanen et al. ............ 370/342 |
| 6,137,789 A | * | 10/2000 | Honkasalo .................. 370/342 |
| 6,148,209 A | * | 11/2000 | Hamalainen et al. ....... 455/450 |
| 6,173,007 B1 | * | 1/2001 | Odenwalder et al. ....... 375/146 |
| 6,219,343 B1 | * | 4/2001 | Honkasalo et al. ......... 370/335 |

FOREIGN PATENT DOCUMENTS

| JP | 7-38963 | 2/1995 |
| JP | 07-154866 | 6/1995 |
| JP | 7-312783 | 11/1995 |
| JP | 9-36801 | 2/1997 |
| WO | WO 97/16000 | 5/1997 |

OTHER PUBLICATIONS

Scheduling To Meet Mixed Quality Of Service Requirements In Wireless Networks, Mobile Multimedia Communications, Edited by Goodman and Raychaudhuri, Plenum Press, New York, 1997.

International Search Report for PCT/JP98/03666.

Partial European Search Report for App. No. 98938888.9, Feb. 14, 2002.

B. Epstein et al., "Reservation Strategies For Multi–Media Traffic In A Wireless Environment," Vehicular Technology Conference, 1995 IEEE 45th Chicago, IL, Jul. 25, 1995, pp. 165–169.

A. Baier, "Design Study For A CDMA–based Third–Generation Mobile Radio System," IEEE Journal On Selected Areas In Communications, vol. 12, No. 4, May 1994, pp. 733–743.

Brocha Epstein, et al., *Reservation Strategies for Multi–Media Traffic in a Wireless Environment*, 1995 IEEE, pp. 165–169.

Official Notice of Rejection dated May 31, 2005 from Japanese Patent Office with translation.

\* cited by examiner

*Primary Examiner*—Ricky Ngo
*Assistant Examiner*—Duc Duong
(74) *Attorney, Agent, or Firm*—Brown Raysman Millstein Felder & Steiner LLP (57) ABSTRACT

A signal transmission method checks, when detecting an occurrence of a communication request, whether the communication request is a high speed communication (step S302). In the case of the high speed communication, it checks whether the number of current high speed communications (m) plus one is greater than the upper limit ($m_{max}$) of the high speed communication (step S312). If greater, it cancels the request as a call loss (S316), and sets to a variable a the ratio (h) of the rate of the high speed communication to that of a low speed communication. If the communication request is the low speed communication, it sets one to the variable a (step S304). It compares n plus a with $n_{max}$ (step S306), where n is the total number of all the current communications, a is the value associated with the communication request, and $n_{max}$ is the upper limit of the number of communications acceptable in a bandwidth, all of which are expressed in terms of the number of the low speed communications. If n plus a is greater than $n_{max}$, the communication request is canceled as a call loss (S316). Otherwise, the total number of the current high speed communications (m) and the total number of all the current communications (n) expressed in terms of the number of the low speed communications are updated, and a channel is assigned to the communication request (step S310).

17 Claims, 7 Drawing Sheets

SIGNAL TRANSMISSION METHOD AND BASE STATION IN MOBILE COMMUNICATION

This application is a continuation of PCT/JP98/03666, filed Aug. 19, 1998.

TECHNICAL FIELD

The present invention relates to signal transmission over traffic channels of cellular mobile communications simultaneously carrying out multiple communications between a base station and a plurality of mobile stations at different transmission rates, and more particularly to signal transmission which is effective in achieving simultaneous multiple communications in the same band at different transmission rates through forward channels in CDMA mobile communications.

BACKGROUND ART

Conventionally, voice communications have been a mainstream of the cellular mobile communications with data communications constituting only a small part thereof. The data communications taking place occasionally are handled at the same transmission rate as the voice communications. Recently, however, demand for high speed data communications has been sharply growing, highlighting a signal transmission method that carries out multiple communications at different transmission rates. Thus, not a few papers are published about this subject. For example, J. M. Harris and S. P. Kumar, "Scheduling to Meet Mixed Quality of Service Requirement in Wireless Networks", MoMuc, 1996, studied voice (low speed) communications and a signal transmission scheme over reverse traffic channels handling a mixture of data and image (high speed) communications, and proposed a method that separated in advance the voice traffic channels from image traffic channels. Considering actual mobile data communication services, however, it is expected that leading usage patterns are such that mobile stations access databases connected to a fixed network to read data. Accordingly, a signal transmission method over forward traffic channels becomes important. In addition, as a mobile communication scheme from now on, a CDMA scheme is promising because of its high frequency efficiency. It is possible for the forward traffic channels in the CDMA to achieve, besides the scheduling of transmission timings, orthogonalization of spreading codes, precise transmission power control considering the transmission power of other communications, and the like. The forward channels, however, undergo only insufficient study although they differ greatly from the reverse channels.

As described above, the signal transmission method for carrying out simultaneous multiple communications at different transmission rates is not yet in the practical use in the conventional cellular mobile communications. Although some papers examined it, an efficient signal transmission method has not yet been studied which integrally considers in the mobile communications the transmission power over the forward channels, the number of traffic channels and the balance between the forward and reverse traffic. In particular, only insufficient studies have been achieved of the CDMA mobile communication scheme which is promising from now on.

DISCLOSURE OF THE INVENTION

An object of the present invention is to provide a traffic channel allotting method for achieving efficient simultaneous communications at different transmission rates through forward channels in the same band.

To accomplish the object, the present invention is characterized by a signal transmission method over a forward traffic channel in cellular mobile communications that can simultaneously perform multiple communications between a plurality of mobile stations and a base station at different transmission rates, the signal transmission method comprising the steps of: detecting, on a base station side, whether a communication request is made for a high speed communication with a transmission rate higher than a predetermined rate; and rejecting the communication request for the high speed communication, if a total number of high speed communications transmitted simultaneously exceeds a predetermined fixed value when the detected communication request for the high speed communication is added.

Employing this configuration can limit the traffic of the high speed communications, thereby ensuring channels for low speed communication calls.

Here, it is possible to accept the new communication request if a total number of communications transmitted simultaneously is less than or equal to a predetermined fixed value when the detected communication request for the high speed communication is added, to temporarily hold the communication request if the total number is greater than the fixed value, and to accept the communication request after waiting until the total number of the communications becomes less than or equal to the fixed value.

This configuration limits by the delay the traffic of the high speed communications, thereby ensuring the channels for the low speed communication calls.

It is also possible to accept the communication request without delay if a total number of communications transmitted simultaneously is less than or equal to a predetermined first threshold value when the detected communication request for the high speed communication is added, to accept the communication request with limiting the transmission rate of the requested communication if the total number of the communications is greater than the first threshold value and is less than or equal to a predetermined second threshold value to transmit the accepted high speed communication at the limited transmission rate, and to reject the communication request when the total number of the communications is greater than the second threshold value.

In this case, it is also possible to temporarily hold the communication request for a time period if the total number of the communications is greater than the second threshold value, and to accept the communication request after waiting until the total number of the communications becomes less than or equal to the threshold value.

In this control, the traffic of the high speed communications is limited by restricting not only the number of communications but also their rates.

In a CDMA communication scheme, similar control can be achieved by using transmission power of all the high speed communications transmitted simultaneously, or transmission power of all the communications transmitted simultaneously.

Furthermore, the fixed value, the first threshold value or the second threshold value can be varied in accordance with the number of low speed communications with a transmission rate less than the predetermined rate.

This makes it possible to adaptively control the upper limit of the traffic of the high speed communications in accordance with the traffic of the low speed communication calls.

Finally, it is possible to carry out channel assignment of a combination of channels whose forward channel transmission rate is higher than a reverse channel transmission rate. This provides an efficient signal transmission method when an information amount of the forward link communications is greater than that of the reverse link communications.

The present invention can also includes a base station implementing these methods.

BEST MODE FOR CARRYING OUT THE INVENTION

The invention will now be described with reference to the accompanying drawings.

Figure 1:
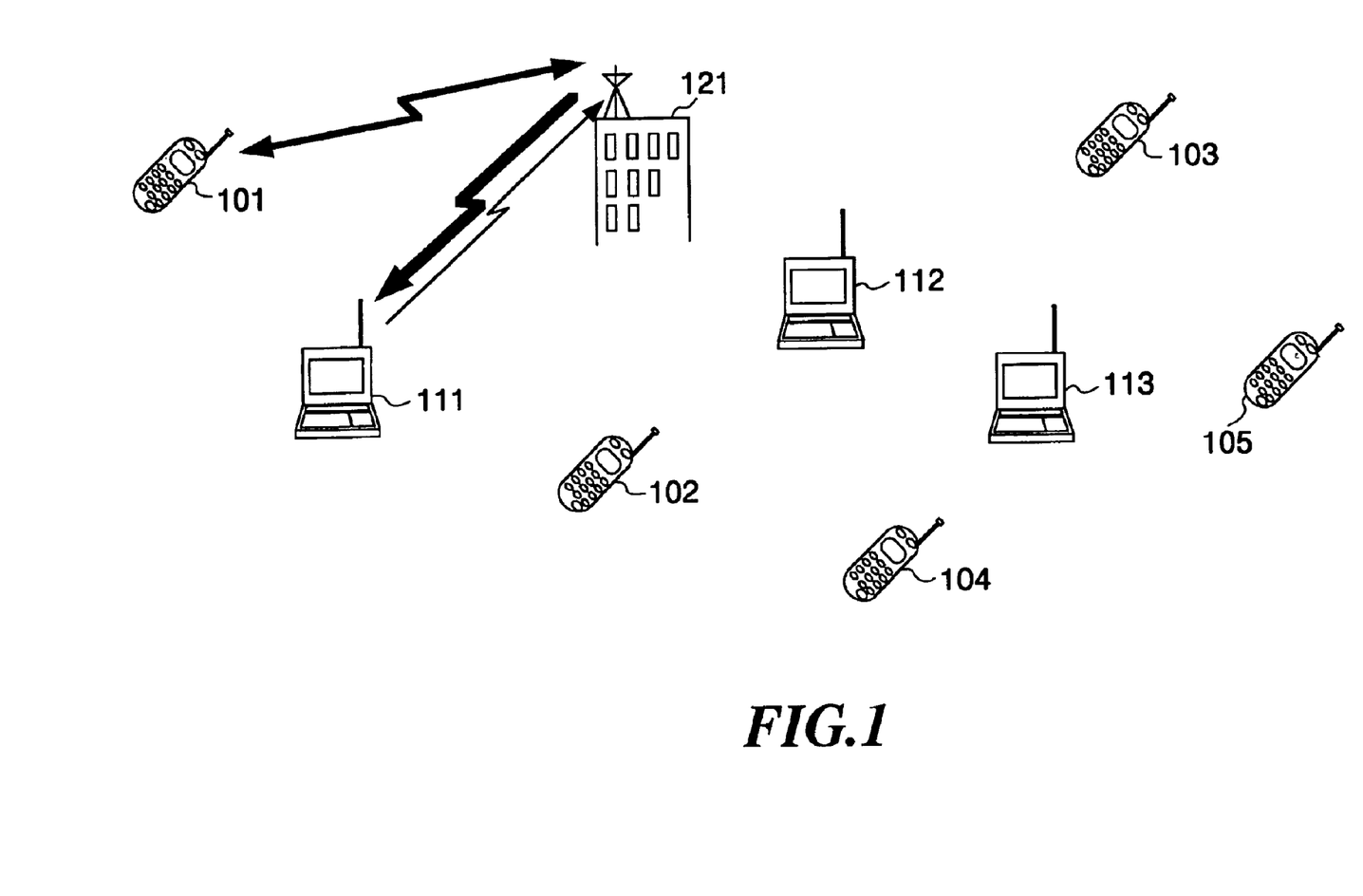
FIG. 1 is a schematic diagram imaging cellular mobile communications simultaneously carrying out multiple communications at different transmission rates.

FIG. 1 is a schematic diagram illustrating cellular mobile communications simultaneously carrying out multiple communications at different transmission rates. In FIG. 1, mobile stations 101–105 are portable phones. The mobile station 101, for example, is carrying out voice communications with a base station 121 with exchanging low speed coded voice signals with the base station. Mobile stations 111–113 are portable information terminals. The portable information terminal 111, for example, is carrying out data communications with a database (not shown) in a fixed network (not shown) through the base station 121.

In the conventional cellular mobile communications, the voice communications are the mainstream, and hence forward and reverse link signal amounts are nearly the same. In contrast with this, it is likely in the data communications which have been sharply growing recently that a portable information terminal such as the mobile station 111 accesses a database in a fixed network, and receives a great amount of data. In such a case, the reverse link signal sent from the mobile station will be a brief signal requesting the data, whereas the forward link signal transmitted from the base station will a large amount of requested information, which is much greater in the amount than the reverse link signal. Therefore, it is important to control the forward traffic more efficiently than the reverse traffic.

(First Embodiment)

Figure 2:
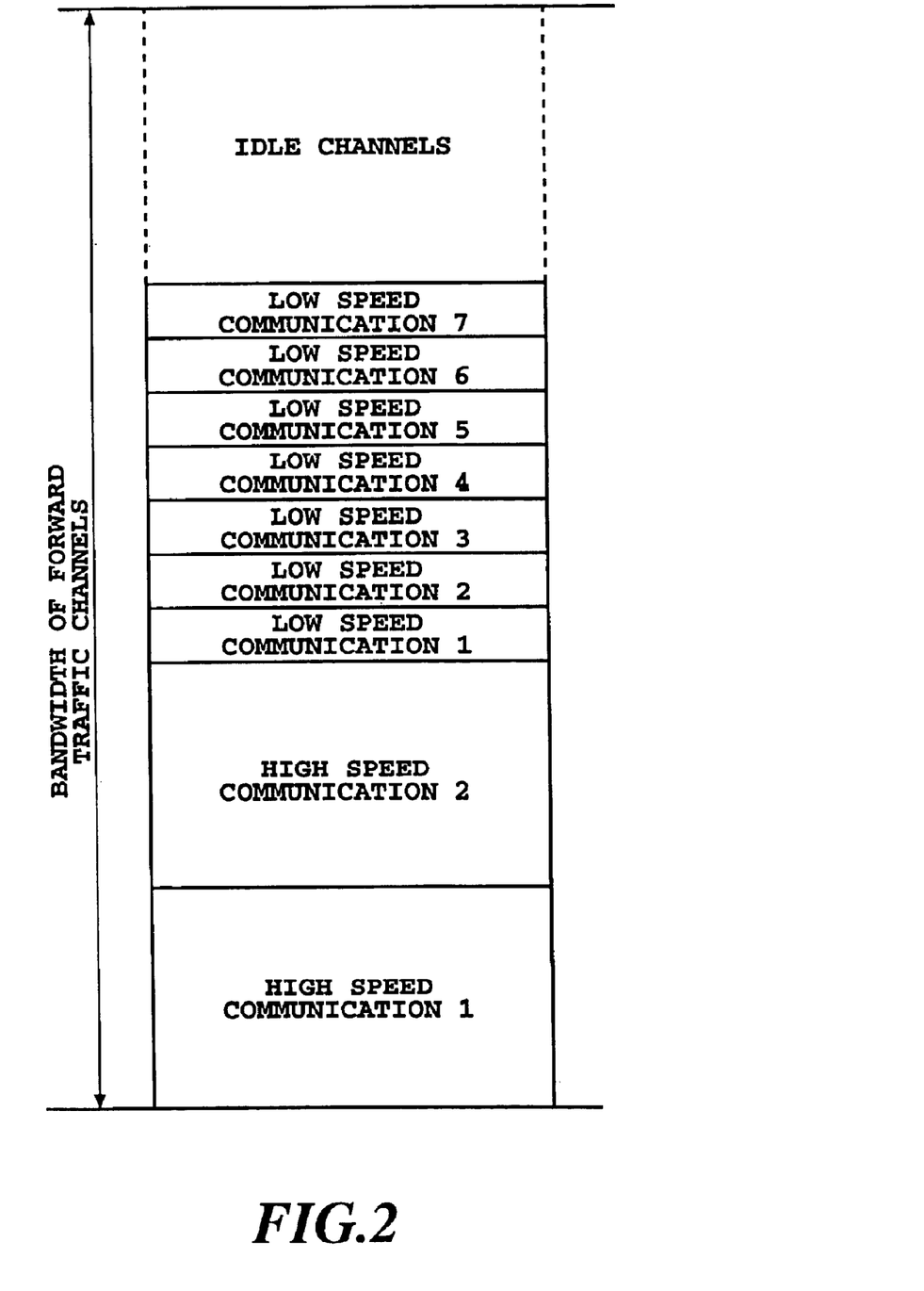
FIG. 2 is a diagram illustrating signal transmission over forward traffic channels in an embodiment in accordance with the present invention.

FIG. 2 is a diagram illustrating signal transmission over forward traffic channels in the present invention, which illustrates bandwidths of forward traffic channels, and a present state of the channels in use. This example is one of the CDMA mobile communications including two communication types: low speed communications and high speed communications. The high speed communications each use a bandwidth four times that of the low speed communications. When the low speed communications occupy the entire band, it can accommodate 20 communications, whereas when the high speed communications occupy the entire band, it can accommodate five communications.

In the following description, it is assumed that the upper limit of the high speed communications is two. In the example of FIG. 2, two high speed communications and seven low speed communications are taking place. Although the bandwidth as shown in FIG. 2 can afford to accommodate another new request for the high speed communication, the new request is rejected in the channel allotting method in accordance with the present invention. This is because the total number of the high speed communications becomes three in this case, and hence exceeds the upper limit. Thus, the new request is canceled as a call loss.

Low speed communication requests taking place subsequently can be added up to five at a maximum.

Figure 3:
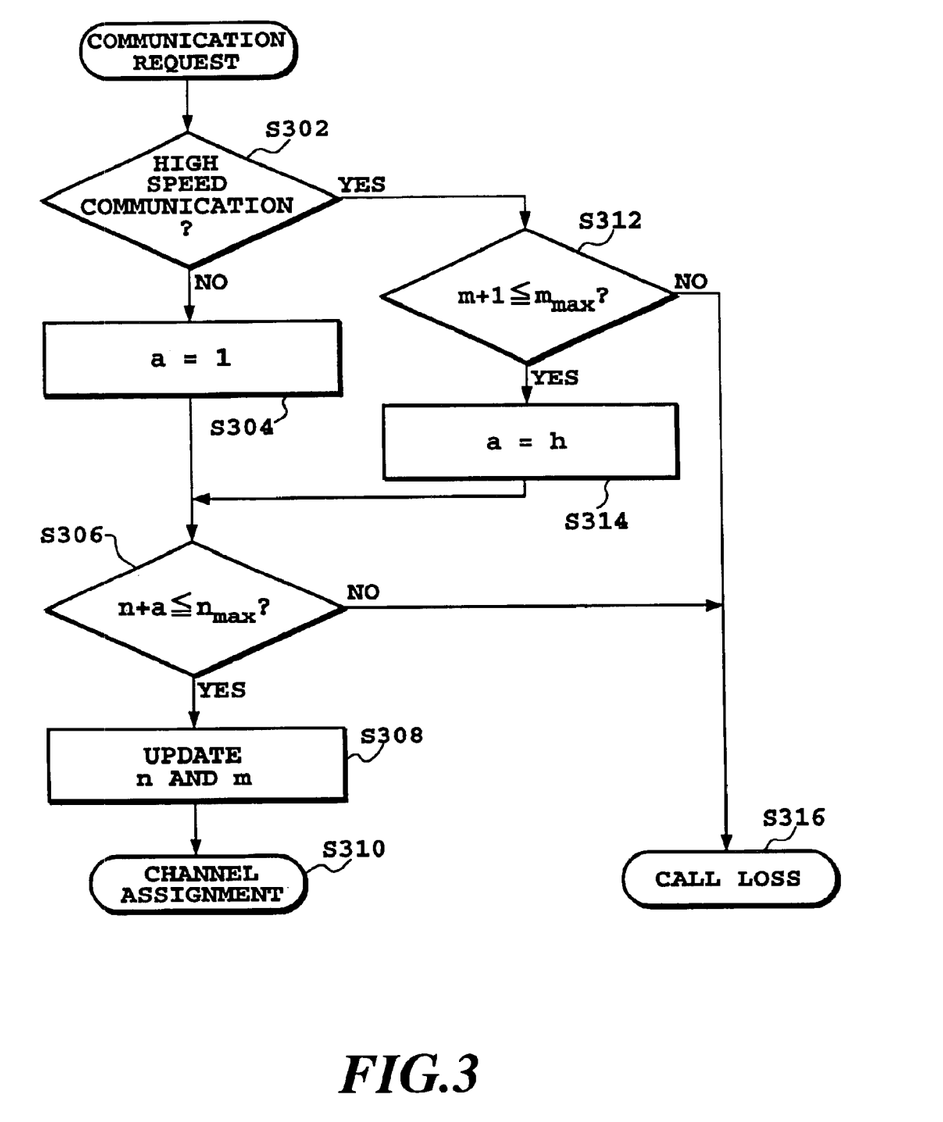
FIG. 3 is a flowchart of the embodiment in accordance with the present invention.

FIG. 3 is a flowchart illustrating the control in the base station 121 when the foregoing upper limit of the high speed communications is set. In FIG. 3, m is the number of the current high speed communications; $m_{max}$ is the upper limit of the high speed communications ($m_{max}$ is two in the present embodiment); n is the total number of the current communications expressed in terms of the number of the low speed communications; $n_{max}$ is the upper limit of the low speed communications the present bandwidth can accommodate when all the communications are the low speed communications; h is a ratio of the transmission rate of the high speed communication to that of the low speed communication (h=4 in the present embodiment); and a is a variable.

Detecting a communication request from any of the mobile stations 101–105 and 111–113 or from a switching network connected to the base station 121, the base station 121 checks whether the communication request is a high speed communication or not at step S302. If it is the high speed communication, the base station 121 checks whether the current number of the high speed communications (m) plus one is greater than the upper limit of the high speed communications ($m_{max}$) at step S312. If it is greater, the base station 121 cancels the high speed communication as a call loss at step S316. If not, the base station 121 sets to the variable a the ratio (h) of the high speed transmission rate to the low speed transmission rate at step S314.

If the communication request is a low speed communication request, the base station 121 sets the variable a at one at step S304. Then, it adds, to the total number of the current communications (n) expressed in terms of the number of the low speed communications, the value a of the communication request expressed in terms of the number of the low speed communications, and compares it at step S306 with the upper limit ($n_{max}$) expressed in terms of the number of the low speed communications that can be accommodated in the bandwidth. If n+a is greater than $n_{max}$, the base station 121 cancels the communication request as a call loss at step S316. If not, the base station 121 updates at step S308 the number of the current high speed communications (m) and the total number of the current communications (n) expressed in terms of the number of the low speed communications, and assigns a channel to the communication request at step S310.

Figure 4:
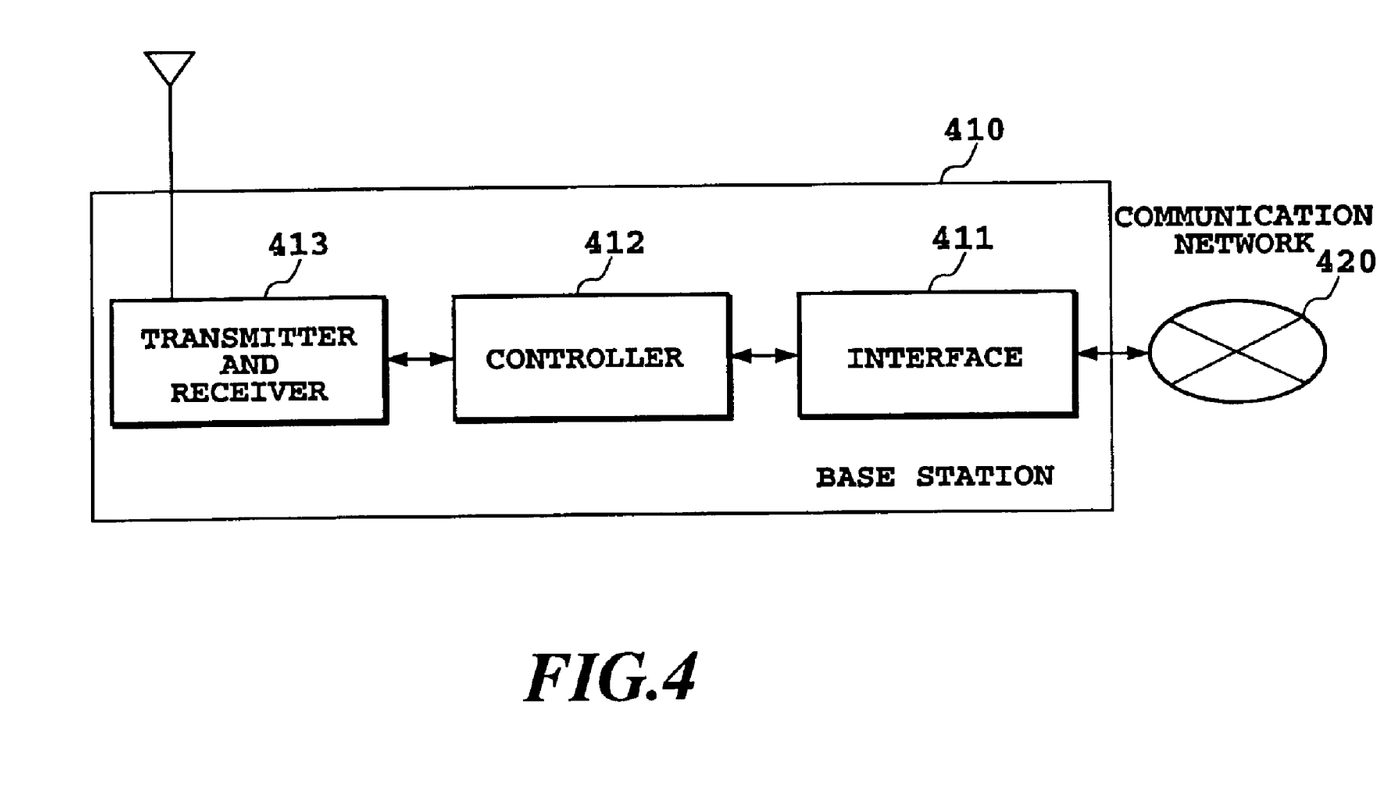
FIG. 4 is a block diagram showing a configuration of a base station for implementing embodiments in accordance with the present invention.

FIG. 4 is a block diagram showing a configuration of a base station 410 for implementing the present embodiment.

In the forward link communication from the base station to a mobile station, an interface 411 of the base station 410, receiving a new communication request from a communication network 420 connected to the base station, transfers the signal to a controller 412. The controller 412 makes a decision as to whether it can accept the communication request according to the flowchart in FIG. 3, decides the channel when it can accept it, and transfers to a transmitter and receiver 413 a signal to be transmitted and information about a channel to be used. When the controller 412 cannot accept the communication request, it cancels it as a call loss. The transmitter and receiver 413 transmits the received transmission signal through the assigned channel. The control of the reverse link communication from the mobile station to the base station is carried out in the same manner.

As for a communication with a data signal that allows delay, the controller 412 holds it for an allowable delay time without canceling it as a call loss even if the controller 412 cannot accept it immediately. If the controller 412 gets ready to accept it while holding it, the controller 412 decides a channel to be used, and transfers to the transmitter and receiver 413 the transmitted signal and information about the channel.

(Second Embodiment)

The second embodiment relates to the control in a base station which can place a speed limit on the high speed communication between the base station and mobile stations. In this case, even if the total number of the high speed communications exceeds a (first) threshold value due to a new high speed communication request, the new communication is allowed with a limited rate. To achieve such control, the base station sets a second threshold value which is greater than the first threshold value, and performs such control that rejects a new high speed communication if the sum total of all the current communications exceeds the second threshold value.

For example, assume that the first threshold value used for the speed limit is two, and the second threshold value used for the traffic control is 18 expressed in terms of the number of the low speed communications, and that the transmission rate under the speed limit is twice the rate of the low rate communication. In addition, it is assumed that the remaining conditions are the same as those of FIG. 2.

A new high speed communication request taking place in the conditions as shown in FIG. 2 is not readily accepted because the number of the high speed communications exceeds the first threshold value, but is accepted under the speed limit.

Figure 5:
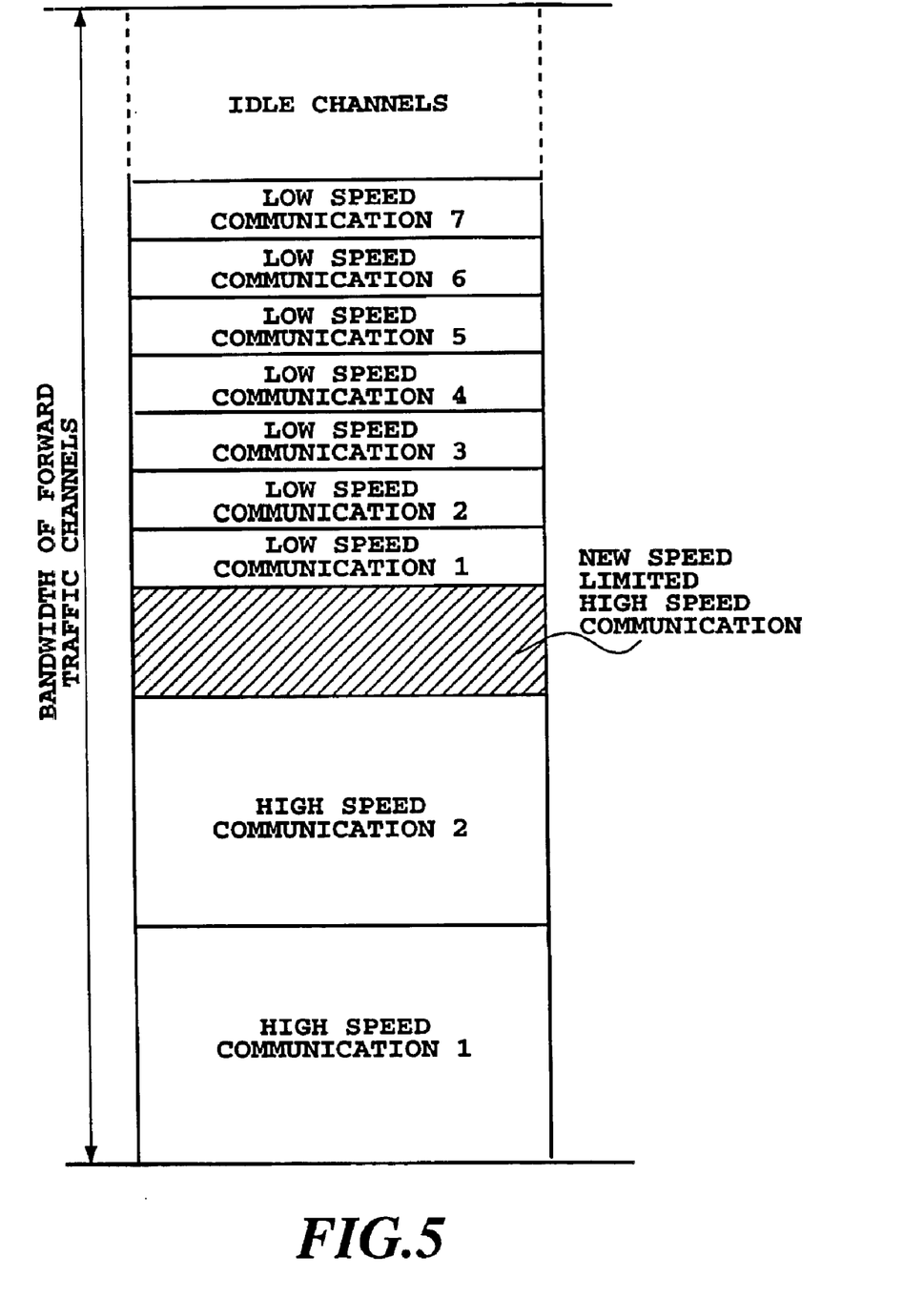
FIG. 5 is a diagram illustrating a signal transmission method over forward traffic channels in a second embodiment in accordance with the present invention.

FIG. 5 illustrates the channel used state when accepting the high speed communication under the speed limit. As illustrated in FIG. 5, the total number of the communications is 17 expressed in terms of the number of the low speed communications, which is less than the second threshold value. Thus, one more speed limited high speed communication and one more low speed communication, or three more low speed communications can be accepted in this case.

Figure 6:
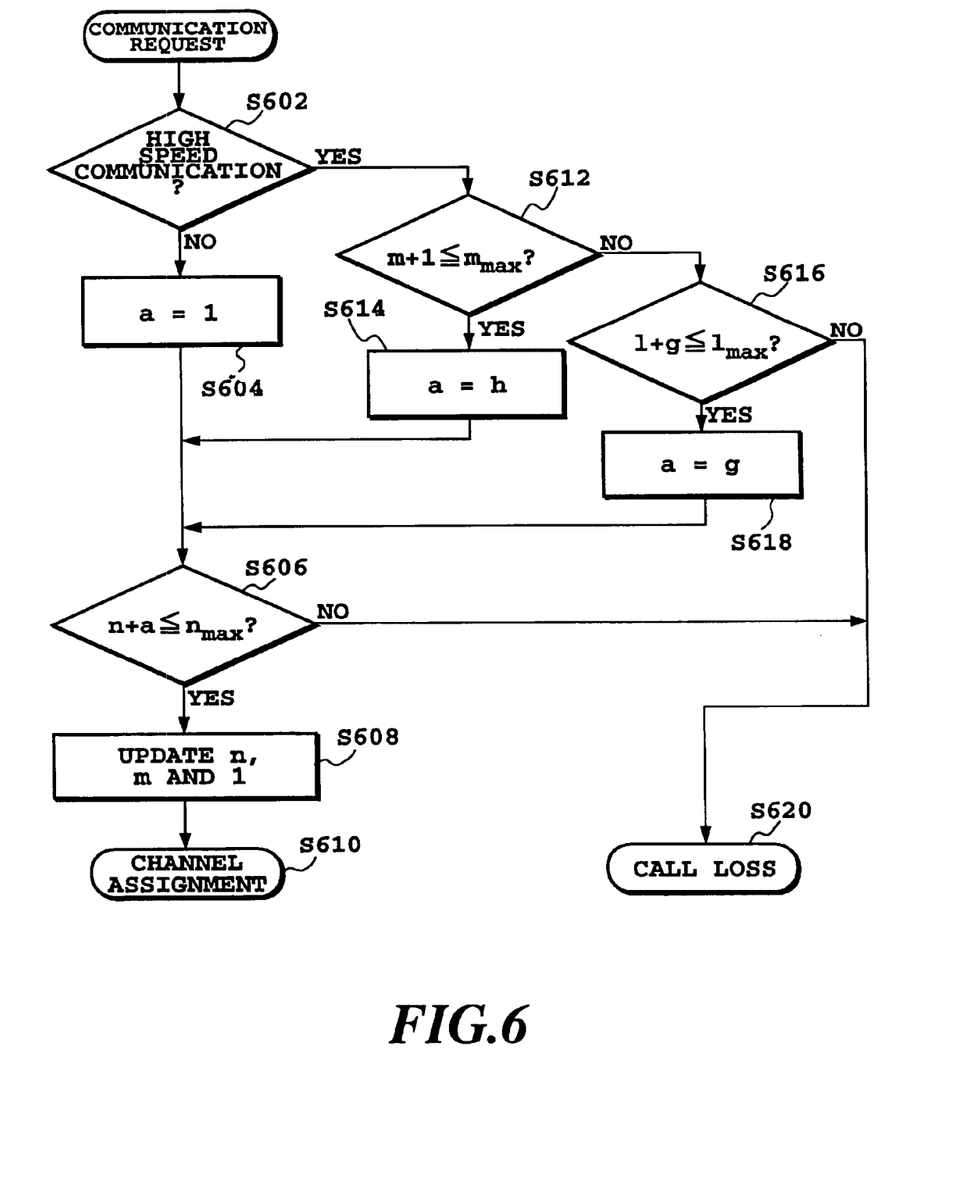
FIG. 6 is a flowchart of the second embodiment in accordance with the present invention.

FIG. 6 is a flowchart illustrating the control in the base station in the second embodiment. In FIG. 6, l is the total number of the high speed communications with and without the speed limit, which is expressed in terms of the number of the low speed communications; $l_{max}$ is the upper limit of l ($l_{max}$=18, in this embodiment); g is a ratio of the rate of the speed limited high speed communication to the rate of the low speed communication (g=2 in the present embodiment); and the remaining symbols are the same as those of FIG. 3. This control is also carried out by the controller 412 in the arrangement as shown in FIG. 4.

In the flowchart of FIG. 6, when a new communication request takes place, the controller 412 decides whether the communication is a high speed communication or not at S602. If it is a high speed communication, the controller 412 checks at step S612 whether the total number of the current high speed communications (m) plus one is greater than the upper limit ($m_{max}$) of the high speed communications. If it is greater, the controller 412 compares at S616 the sum of l and g with the upper limit $l_{max}$, where l is the total number of the high speed communications with and without the speed limit, g is the number of the speed limited high speed communications, and $l_{max}$ is the upper limit of the total number of the high speed communications with and without the speed limit, all of which are expressed in terms of the number of the low speed communications. If the sum is greater, the new communication request is canceled as a call loss at step S620. If the sum is smaller, the variable a is set to the ratio g of the rate of the speed limited high speed communication to that of the low speed communication at step S618.

If the check result at step S612 shows that the total number of the high speed communications does not exceed the upper limit $m_{max}$, the variable a is set to the ratio (h) of the rate of the high speed communication to that of the low speed communication at step S614.

If the new communication is a low speed communication, the variable a is set to one at step S604. Subsequently, the controller 412 compares the sum of n and a with $n_{max}$ at step S606, where n is the total number of the current communications expressed in terms of the number of the low speed communications, a is the width of the new communication expressed in terms of the number of the low speed communications, and $n_{max}$ is the acceptable number of communications of the band expressed in terms of the number of the low speed communications. If the sum is greater than $n_{max}$, the acceptable number of communications of the band expressed in terms of the number of the low speed communications, the new communication request is canceled as a call loss at step S620. On the other hand, if the sum is equal to or less than $n_{max}$, the controller 412 updates at step S608 the number of the current high speed communications (m), and the total number of all the current communications (n) expressed in terms of the number of the low speed communications. Then, the controller 412 assigns a channel to the communication request at step S610.

The present embodiment can also be configured such that it holds, when a communication consists of a data signal allowing delay, the communication for an allowable delay time without canceling the communication as a call loss even if it cannot accept the communication at present, and that if it gets ready to accept the communication while holding the communication, it decides a channel to be used, and transfers the signal to be transmitted and information about the channel.

Although the value $l_{max}$ is determined in accordance with actual traffic and the bandwidth, the traffic greatly varies depending on an area and time in practice. For example, it is estimated that the ratio of the data communications (high speed communications) increases in a business district during the daytime, and the ratio of the voice communications (low speed communications) is high in a residential district. In the night time, traffic of the business district will sharply reduce, and the ratio of the data communications may increase in the residential district.

Thus, the appropriate values $l_{max}$ and $n_{max}$ vary depending on the traffic. Taking account of this, a method can be considered for adaptively varying these values in accordance with the traffic. For example, when the ratio of the voice communications is high, the values $l_{max}$ and $n_{max}$ are set at small values, and when the ratio of the voice communications is low, the values $l_{max}$ and $n_{max}$ are set at large values, thereby enabling efficient use of the band independently of the traffic.

A similar idea is also applicable to the value $m_{max}$ in the first embodiment.

(Third Embodiment)

Actual CDMA mobile communications carry out the transmission power control, and the capacity in terms of the number of users can be limited by the total transmission power. In such a case, it is more effective to control the traffic in accordance with the transmission power rather than the number of the communications. Although increasing transmission power is required with an increase in the transmission rate, the transmission power will vary depending on locations of mobile stations, traffic (an interference amount) of the communications, and the like, even under the same transmission rate.

The third embodiment in accordance with the present invention controls the reception control of a high speed communication using an upper limit of the transmission power.

Figure 7A:
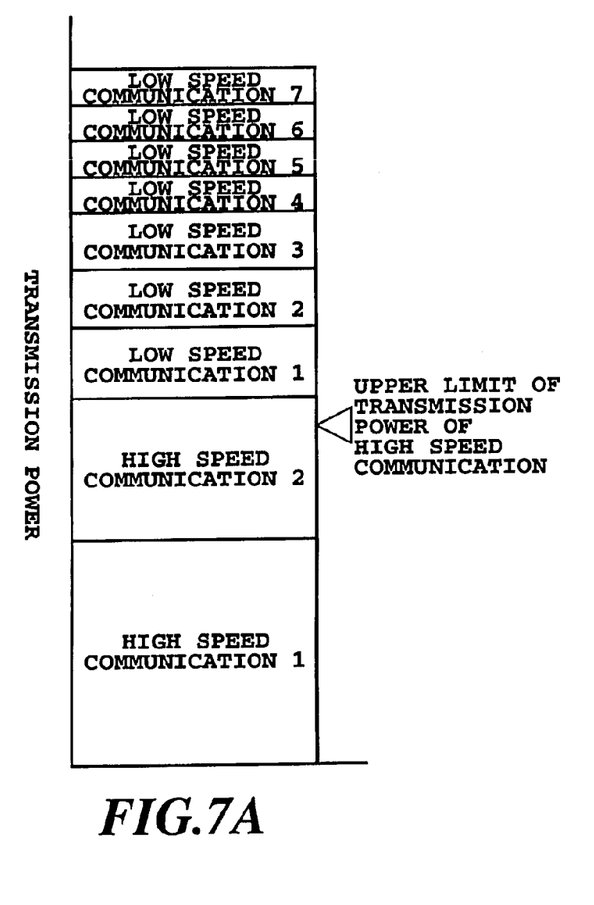
FIGS. 7A and 7B are diagrams illustrating transmission power of a base station in a third embodiment in accordance with the present invention.
Figure 7B:
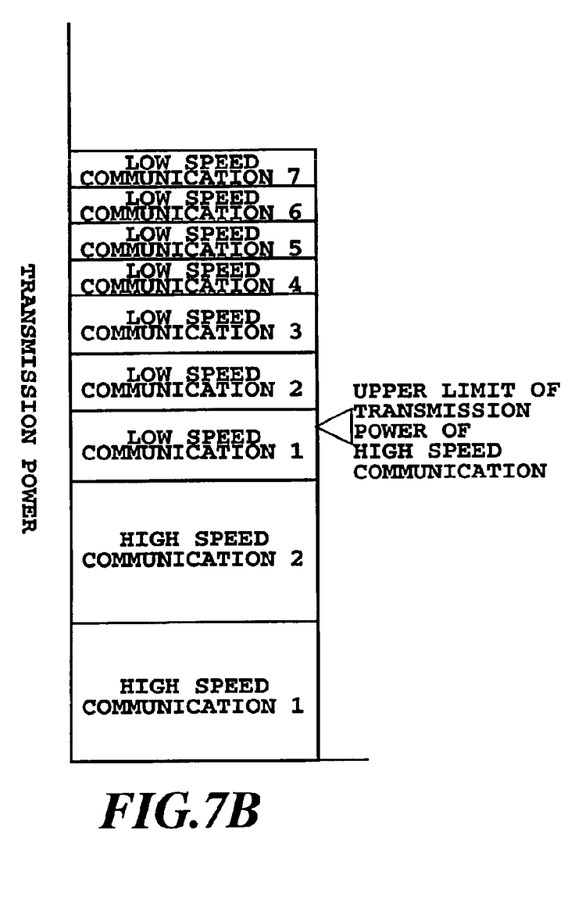

FIGS. 7A and 7B shows an example of transmission power conditions of the base station in the third embodiment in accordance with the present invention. In FIGS. 7A and 7B, the high speed communications 1 and 2 have the same transmission rate. However, the mobile station associated with the high speed communication 1 as shown in FIG. 7 is remote from the base station. Therefore, the transmission power of the high speed communication 1 is much greater than that of the high speed communication 2. A new high speed communication request taking place in the state as shown in FIG. 7A is unacceptable because the transmission power of the current high speed communications exceeds the upper limit, and is canceled as a call loss.

On the other hand, a new high speed communication request taking place in the state as shown in FIG. 7B is acceptable because the transmission power of the current high speed communications is less than the upper limit.

Although the upper limit is set for the transmission power of the high speed communications in the foregoing example, an upper limit can be set for the transmission power of the high and low speed communications so that the acceptance of the high speed communication can be decided and controlled by the upper limit.

In the control based on the transmission power, two or more threshold values can be provided to control the communication speed as in the second embodiment. In addition, these threshold values can be dynamically controlled.

The present embodiment can also be configured such that it holds, when a communication consists of a data signal that allows delay, the communication request for an allowable delay time without canceling the communication as a call loss even if it cannot accept the communication at present, and that when it gets ready to accept the communication while holding it, it decides a channel to be used, and transfers the signal to be transmitted and information about the channel.

Since a forward link information amount is expected to be greater than a reverse link information amount as described before, efficient assignment of the forward traffic channels must be achieve. Basically, however, it is effective to provide a greater transmission capacity to the forward channels than to the reverse channels, in which case the foregoing signal transmission will further increase the efficiency.

As described above, the signal transmission method in accordance with the present invention can implement efficient signal transmission over forward traffic channels when carrying out multiple communications with different transmission rates in cellular mobile communications. Since it is expected that the forward link information amount is greater than the reverse link information amount in actual mobile communications, the present signal transmission method is particularly effective when it is applied to the forward traffic channels.

Applying the high speed communication to the reverse link communications will increase the transmission power of mobile stations. Thus, it is better for reverse links not to assume the high speed communications, which will serve to reduce the size of the mobile stations. In this case, since the reverse link communications consist of a large number of low speed communications, a large grouping effect can be expected, which will simplify the control without any problem. However, since the forward link communications include the high speed communications, high accuracy traffic control is required, to which the present invention is effectively applicable.

What is claimed is:

1. A signal transmission method over a forward traffic channel in cellular mobile communications that can simultaneously perform one or more high speed communications whose transmission rates are higher than or equal to a predetermined rate, and one or more low speed communications whose transmission rates are lower than the predetermined rate between a plurality of mobile stations and a base station, said signal transmission method comprising the steps of:

checking, on a base station side, whether a communication request is made for a high speed communication;

checking, if the communication request is made for a high speed communication, whether transmission power of all high speed communications performed simultaneously becomes greater than a predetermined first threshold value if the communication request as accepted;

checking whether transmission power of all communications performed simultaneously becomes greater than a predetermined second threshold value if the communication request is accepted; and restricting acceptance of the communication request, if the transmission power of all high speed communications becomes greater than the first threshold value or the transmission power of all communications becomes greater than the second threshold value.

2. The signal transmission method as claimed in claim 1, wherein the step of restricting rejects the communication request, if the transmission power of all high speed communications becomes greater than the first threshold value.

3. The signal transmission method as claimed in claim 1, wherein the step of restricting temporarily holds, if the transmission power of all high speed communications becomes greater than the first threshold value, the communication request for an allowable time period to wait for the transmission power of all high speed communications to become less than or equal to the first threshold value, and rejects the communication request if the transmission power of all high speed communications does not become less than or equal to the first threshold value within the allowable time period.

4. The signal transmission method as claimed in claim 1, wherein the step of restricting checks, if the transmission power of all high speed communications becomes greater than the first threshold value, whether the transmission power of all high speed communications becomes greater than a predetermined third threshold value if the communication request is accepted, and accepts the communication request with limiting a transmission rate of the requested communication if the transmission power of all high speed communications becomes less than or equal to the third threshold value, and temporarily holds, if the transmission power of all high speed communications becomes greater than the third threshold value.

5. The signal transmission method as claimed in claim 4, further comprising the step of varying the second threshold value in accordance with a number of low speed communications.

6. The signal transmission method as claimed in claim 1, wherein the step of restricting checks, if the transmission power of all high speed communications becomes greater than the first threshold value, whether the transmission power of all high speed communications becomes greater than a predetermined third threshold value if the communication request is accepted, and accepts the communication request with limiting a transmission rate of the requested communication, if the transmission power of all high speed communications becomes less than or equal to the third threshold value, and temporarily holds, if the transmission power of all high speed communications becomes greater than the third threshold value, the communication request for an allowable time period to wait for the transmission power of all high speed communications to become less than or equal the third threshold value, and rejects the communication request if the transmission power of all high speed communications does not become less than or equal to the third threshold value with the allowable time period.

7. The signal transmission method as claimed in claim 6, further comprising the step of varying the third threshold value in accordance with a number of low speed communications.

8. The signal transmission method as claimed in claim 1, further comprising the step of varying the first threshold value in accordance with a number of low speed communications.

9. The signal transmission method as claimed in claim 1, further comprising the step of carrying out channel assignment of a combination of channels in which a forward channel transmission rate is higher than a reverse channel transmission rate.

10. A base station that simultaneously performs one or more high speed communications whose transmission rates are higher than or equal to a predetermined rate, and one or more low speed communications whose transmission rates are lower than the predetermined rate with a plurality of mobile stations, said base station comprising:
  means for checking whether a communication request is made for a high speed communication;
  means for checking, if the communication request is made for a high speed communication, whether transmission power of all high speed communications performed simultaneously becomes greater than a predetermined first threshold value if the communication request is accepted;
  means for checking whether transmission power of all communications performed simultaneously becomes greater than a predetermined second threshold value if the communication request is accepted; and
  means for restricting acceptance of the communication request, if the transmission power of all high speed communications becomes greater than the first threshold value or the transmission power of all communications becomes greater than the second threshold value.

11. The base station as claimed in claim 10, wherein the means for restricting rejects the communication request, if the transmission power of all high speed communications becomes greater than the first threshold value.

12. The base station as claimed in claim 10, wherein the means for restricting temporarily holds, if the transmission power of all high speed communications becomes greater than the first threshold value, the communication request for an allowable time period to wait for the transmission power of all high speed communications to become less than or equal to the first threshold value, and rejects the communication request if the transmission power of all high speed communications does not become less than or equal to the first threshold value within the allowable time period.

13. The base station as claimed in claim 10, wherein the means for restricting checks, if the transmission power of all high speed communications becomes greater than the first threshold value, whether the transmission power of all high speed communications becomes greater than a predetermined third threshold value if the communication request is accepted, and accepts the communication request with limiting a transmission rate of the requested communication, if the transmission power of all high speed communications becomes less than or equal to the third threshold value, and rejects the communication request, if the transmission power of all high speed communications becomes greater than the third threshold value.

14. The base station as claimed in claim 13, further comprising the means for varying the third threshold value in accordance with a number of low speed communications.

15. The base station as claimed in claim 10, wherein the means for restricting checks, if the transmission power of all high speed communications becomes greater than the first threshold value, whether the transmission power of all high speed communications becomes greater than a predetermined third threshold value if the communication request is accepted, and accepts the communication request with limiting a transmission rate of the requested communication, if the transmission power of all high speed communications becomes less than or equal to the third threshold value, and temporarily holds, if the transmission power of all high speed communications becomes greater than the third threshold value, the communication request for an allowable time period to wait for the transmission power of all high speed communications to become less than or equal to the third threshold value, and rejects the communication request if the transmission power of all high speed communications does not become less than or equal to the third threshold value within the allowable time period.

16. The base station as claimed in claim 15, further comprising the means for varying the third threshold value in accordance with a number of low speed communications.

17. The base station as claimed in claim 10, further comprising the means for varying the first threshold value in accordance with a number of low speed communications.

* * * * *